United States Patent [19]
Gilman

[11] 3,826,475
[45] July 30, 1974

[54] DEFLECTOR AND IMPELLER COMBINATION
[75] Inventor: Robert W. Gilman, San Francisco, Calif.
[73] Assignee: California Pellet Mill Company, San Francisco, Calif.
[22] Filed: July 21, 1972
[21] Appl. No.: 273,687

[52] U.S. Cl. .............................................. 259/14
[51] Int. Cl. ............................................. B01f 9/00
[58] Field of Search ............ 259/18, 12, 14, 3, 175, 259/176, 177; 425/331, 207

[56] References Cited
UNITED STATES PATENTS
2,338,820  1/1944  Peters .............................. 259/175
3,191,227  6/1965  Keefe ............................... 425/331
3,382,818  5/1968  Landers ............................ 425/331
3,581,678  6/1971  Landers ............................ 425/331

Primary Examiner—Robert W. Jenkins
Attorney, Agent, or Firm—Bruce & McCoy

[57] ABSTRACT

The rotating cone of a pellet mill is provided with a plurality of impellers internally connected by a ring which acts to control feed material entering the mill and distributes the material into a space formed between the cone and the impellers. The feed material is then picked up by a plurality of helical deflectors for more even distribution of the feed material into a pellet mill die.

14 Claims, 7 Drawing Figures

PATENTED JUL 30 1974 3,826,475

DEFLECTOR AND IMPELLER COMBINATION

BACKGROUND OF THE INVENTION

1. Field of the Invention

The present invention relates generally to feed deflectors for pellet mills and, more particularly to a combination feed deflector and distributor for more evenly distributing feed material over a die.

2. Description of the Prior Art

Pellet mills for forming feed pellets are widely known. One of the main problems involved with these mills is that caused by the uneven distribution of feed material across the working surface of the die and/or the extrusion rollers. In particular, in the types of pellet mills to which the present invention relates, that is, those utilizing a radially perforated annular extrusion die which is driven and rotates around fixed position extrusion rollers the uneven feeding of material to these mills results in a non-uniform production of pellets, and hence, uneven wear of the die.

Many attempts have been made to overcome the above set forth problems, including indents, knurling, or weld beads placed on the internal surface of the ring die to provide a driving force to move the feed with the ring. In addition, deflector means of the type set forth in U.S. Pat. No. 2,764,951 to Fisher have been used. In this patent, the rotating die cover is provided with radial paddle members which rotate with the die and cover for throwing the material against the inner surface of the die cover. Two guides or scrapers are then utilized in an attempt to divide the material on the inner surface of the die cover evenly and to feed it to one of the rollers. Each of the guides of this patent is designed to pick up the material fed thereto in equal quantities for feeding to the rollers. However, in actual usage, this does not appear to be the case, and uneven distribution of the feed material to the rollers still occurs since the first guide appears to take all of the material out of the cone.

A further attempt to overcome the above set forth problems is mentioned in U.S. Pat. No. 3,382,818 to Landers wherein the revolving cone of the pellet mill is provided with indentations interiorly thereof for picking up materials. However, this patent still produces an uneven distribution of the feed material across the working surface of the die, particularly if the feed mixture fed to the cone is changed in density or consistency.

A still further attempt to overcome the problem of uneven distribution of the feed material over the die is set forth in Dutch Pat. No. 131,137. This patent discloses a pellet mill having three deflectors attached to the roller support and extending therefrom for different distances ranging from one-third to the full distance into the drum whereby an equal amount of feed material is taken by each scooping device for feeding into the die. However, in this patent, there is still a problem involved with directing the feed material to these deflectors.

Applicant's present invention combines the teachings of the prior art patents along with further structure and provides a novel combination feed deflector and direction controlling means which is effective for better and more even distribution of feed material across the working surface of the die.

SUMMARY OF THE INVENTION

The present invention is a feed deflector for a pellet mill comprising a roatable cone having a plurality of impellers secured at one end thereof internally of the cone. An internal ring means is connected to the free ends of each impeller, and the ring and impellers act to control the direction of the material fed into the cone so as to prevent direct flow into the die and to guide it only toward the inner surface of the cone from which space it is removed only by the deflector for more even distribution of the feed material.

OBJECTS OF THE INVENTION

It is therefore an important object of the present invention to provide a direction controlling and deflector means for a pellet mill which can be used in pellet mills having a plurality of rolls.

It is another object of the present invention to provide direction controlling and feed deflector means which act to more evenly distribute materials fed thereto.

It is a further object of the present invention to provide a pellet mill with a guide and impeller means utilized in combination with deflector means to provide more even distribution of the feed material to each roll within a rotating die.

And yet another object of the present invention is the provision of a combination direction controlling and impeller means held in the rotating cone of a pellet mill for causing more even distribution of the feed material to the pellet mill and across the face of the die.

DESCRIPTION OF THE PREFERRED EMBODIMENT

Figure 1:
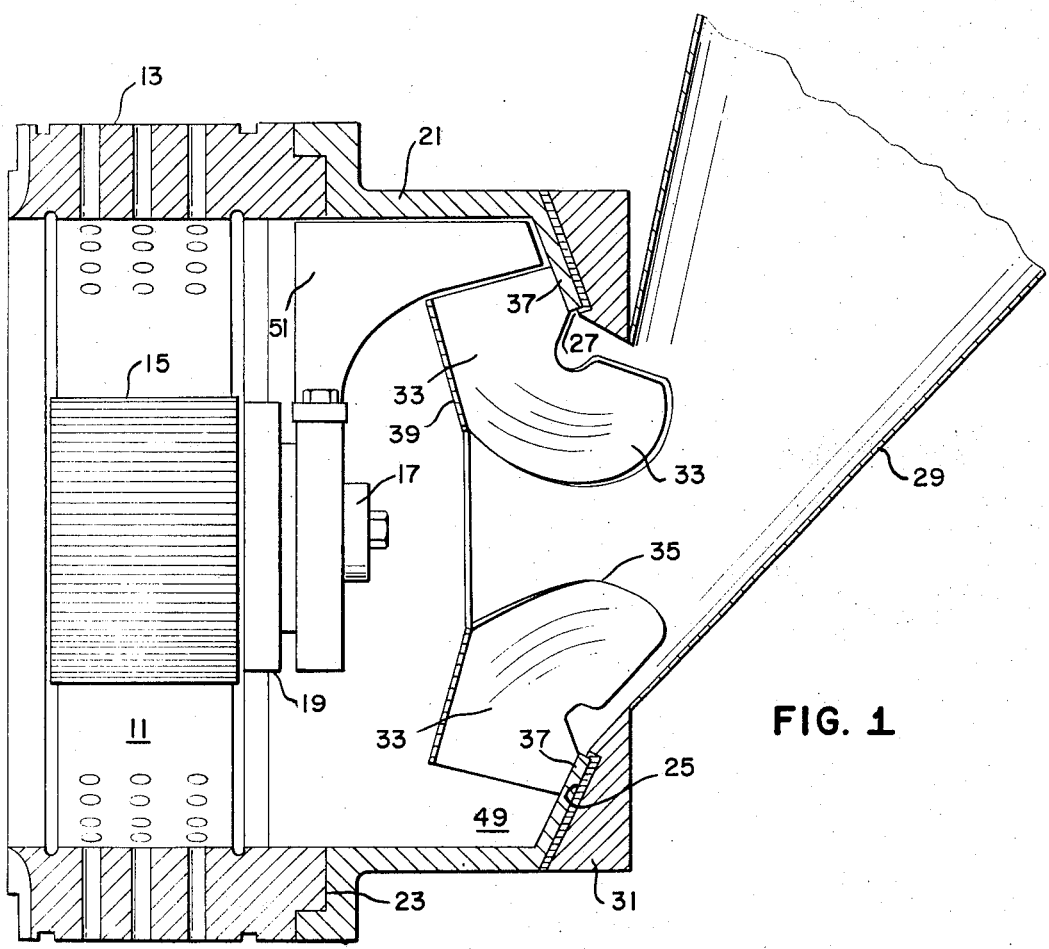
FIG. 1 is a longitudinal vertical sectional view of an extrusion mill embodying the invention.

Referring now to FIG. 1, there shown in skeleton form is a preferred embodiment of a pellet mill in which the present invention is utilized. The pellet mill includes an extrusion assembly 11 having a radially perforated annular extrusion die 13. The extrusion die shown is of the rotating type whereby it is driven around a plurality of extrusion rollers 15 preferably three in number. Each of the rollers is fixed in location and rotates about an eccentrically journaled shaft 17 supported from the frame of the extrusion mill. A retaining plate 19 holds the extrusion rollers and the shaft within the extrusion die, and adjusting means (not shown) are normally provided for adjusting the radial position of the extrusion rollers with respect to the rotating die. In this manner, as the eccentrically journaled shafts 17 are turned, the radial position of the rollers is altered to thereby adjustably alter the outward pressure exerted by the rollers on the die.

A rotating cone 21 is secured to the forward face 23 of the die, in any suitable manner. The rotating cone has a front face portion 25, which may be angled or straight, and includes a central circular opening 27. A feed chute 29 is connected over the opening 27, in any suitable manner, with the discharge end 31 thereof connected with the rotating cone.

A plurality of impellers 33, preferably extending radially and forwardly curved in shape are provided in the cone. Each impeller has a paddle member 35 forming a substantial portion thereof and is secured internally of the cone at 37, in any suitable manner, such as by welding. As shown, four impellers, evenly spaced around the internal periphery of the cone, are provided. The paddle members 35 extend a substantial distance into central opening 27 and into the chute 29, for reasons explained more clearly hereinafter.

Figure 2:
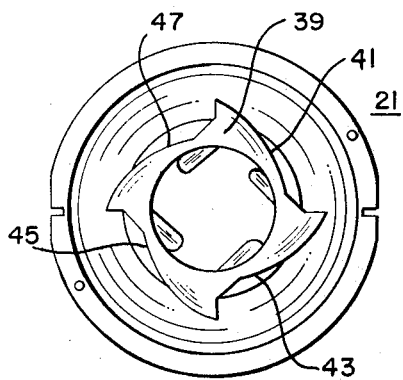
FIG. 2 is a rear view of the combination direction changing and impeller means of the present invention.
Figure 3:
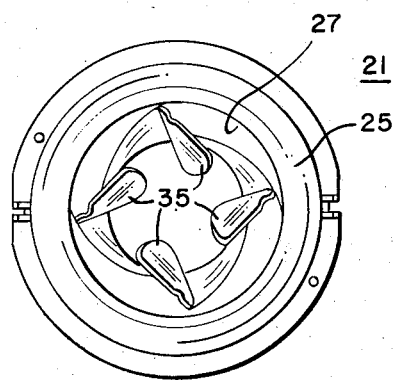
FIG. 3 is a front view showing the mounting of the impellers and direction changing ring in the cone.
Figure 4:
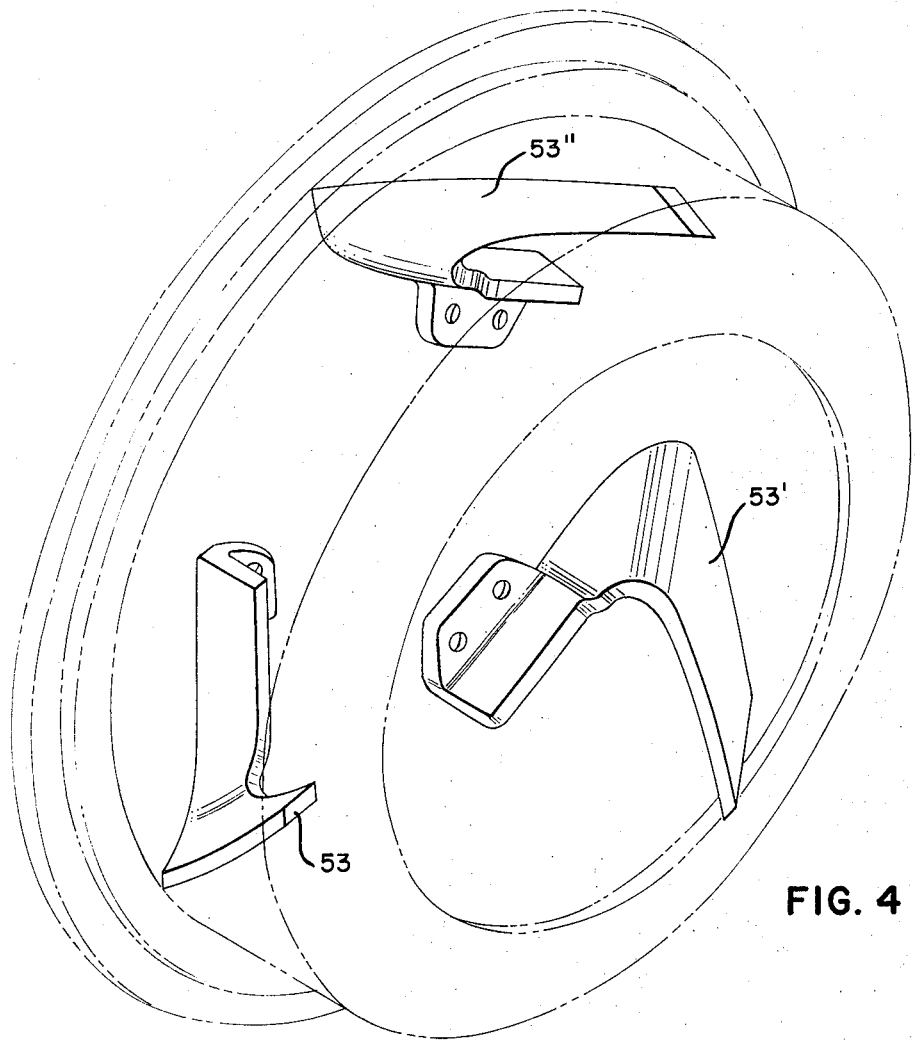
FIG. 4 is a perspective view of the deflector means mounted on the die.
Figure 5:
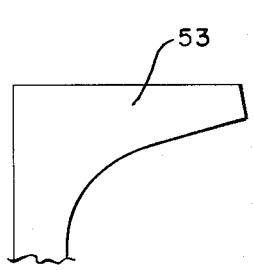
FIGS. 5 - 7 show side elevational view of the preferred embodiments of the three different deflectors.
Figure 6:
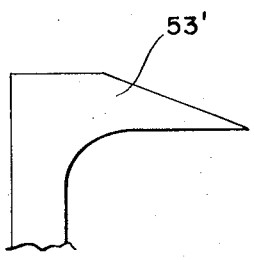
Figure 7:
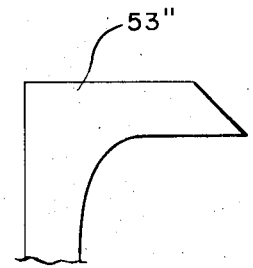

The inner free end of each of the impellers is fixedly secured to a ring member 39, in any suitable manner, such as by welding. As shown more clearly in FIG. 2, this internal ring is formed parallel to the front face of the cone and cut-away in each of four quadrants 41, 43, 45, 47. In this manner, the ring acts to control the direction of flow of material fed thereto, but at the same time, allows the material to flow therethrough, in the event the die cavity should choke up.

In the preferred embodiment of the invention shown, these cut-away portions are provided by utilizing a conical, cylindrical ring having concentric internal and external diameters and cutting the four quadrant portions therefrom, in any suitable manner, to provide open portions in the ring.

If a conical or flat, inner ring having concentric internal and exterior diameters is used, it tends to develop very large forces on the impellers and deflectors during a choke up. The cut-away internal ring of the present invention, together with the four impellers act to control the direction of flow of material and deflect all of the feed material entering the cone outwardly toward the internal surface 50, into a space 49 formed between the outside diameters of the ring and impellers and the internal surface. The ring prevents the material from sliding down the chute into the cone and straight into the space between the die and rollers. In this manner, the horizontal motion component of the feed material entering the cone is stopped whereby the feed material drops down into the cone where it is picked up by the impellers. The impellers then act in the manner of a centrifugal pump to force the feed material into a layer on the internal or inner surface of the cone within space 49. The impellers also function to hold the material with respect to the cone to force the material to rotate with the cone.

The internal ring 39 also provides reinforcing strength to the four impellers 33, to thereby provide a rotating cone of substantially greater strength, as well as direction controlling, deflecting and mixing capabilities greatly improved over those of any existing cone or die cover.

Three deflector means 51, 53, are fixed to the retaining plate 19 or other holding means for the extrusion rollers around the circumference thereof, and dig into or shear off the material in space 49. The deflectors do not stop the motion of the material, but actually shear off a portion of the material to change the direction of flow thereof, and to drive it into the rollers. These three deflectors are preferably helical in shape, and may take any suitable form, such as those shown in FIGS. 1 and 5 – 7.

The three deflectors 51, only one of which shown in full line in FIG. 1, are all substantially the same shape, differing only in length. The length of the first deflector is such that it extends into the space 49 for approximately one-third of its depth, with the second and third deflectors extending into the space for two-thirds and the total depth thereof. In this manner, after the direction of the feed material entering the cone has been changed, and the material distributed into the space 49, by means of the radial impeller means and guide ring, the different length deflectors 51 will shear off equal portions of the material from the layer in space 49. That is, on each rotation of the cone, the first of the deflectors will take approximately one-third of the total material contained in space 49. The helical configuration of the deflector will evenly disgribute the material between a first roller and the rotating die. The second and third deflectors will take approximately the same amount of material on each rotation to thereby distribute a substantially equal amount of feed material between each roller and the die.

A further embodiment of providing for even distribution of the feed material to the pellet mill is provided by the deflector means 53, 53', 53''. These deflectors are evenly spaced around the circumference of the die, and project into the ringshaped space 49, but sweeps only one-third of this space. That is, the first deflector 53'' occupies only one-third of the space in a radial direction commencing from the discharge side of the space, while each of the other deflectors 53', 53 occupies a different third of the space. In this manner, during rotation of the cone, each of these deflectors shears off or takes approximately one-third of the material moving in the ring-shaped space for substantially even distribution of the material contained therein to each of the rolls.

It is therefore an important advantage of the present invention that a combined deflector and impeller means is provided whereby feed material entering the cone will be guided into a space formed between the outside edge of the cone and an internal, annular or ring-shaped space. This material will then be deflected by a plurality of deflectors fixed to a roller retaining means into the space between the roller and the die for a substantially even distribution of the feed material to each roll and over the face of the die to increase the rate of production and the life of the die.

It will be apparent from the foregoing description of the invention, in its preferred form, that it will fulfill all the objects attributal thereto. While it has been illustrated and described in considerable detail, the invention is not to be limited to such details as have been set forth except as may be necessitated by the appended claims.

I claim:
1. A feeding device for a pellet mill die comprising
   a rotatable cone having a plurality of impellers secured at one end thereof internally of said cone, said impellers being aligned generally in a longitudinal plane with respect to said cone and having extended portions protruding into an inlet opening formed centrally of said cone to scoop the material fed into said inlet, and
   a ring fixed to the free ends of said impellers internally of said cone whereby said ring and said impel- lers act in combination to change the direction of flow of feed material and guide the same into the space formed within said cone between the internal surface of said cone, said internal ring, and said impellers.

2. The feeding device of claim 1 wherein said impellers are forwardly curved in the radial direction, and include enlarged paddle portions extending into said inlet opening.

3. The feeding device of claim 2 wherein said ring is formed parallel to the face of said cone, and portions thereof between said impellers, are provided with reduced width portions to permit flow of material therethrough.

4. The feeding device of claim 3 wherein said rotating cone is provided with four impellers spaced evenly around the internal periphery of said cone, and said internal ring is cut away in the quadrants or space formed between adjacent pairs of impellers.

5. A feeding device for a pellet mill comprising
a rotatable cone capable of being fixed to a rotating die of a pellet mill,
four radial impellers fixed at one end thereof internally of said cone, and having paddles fixed to said impellers and extending into the open space formed centrally of said cone into which material is fed, and
a ring secured to and joining the free ends of said impellers internally of said cone, said ring having cutaway portions between adjacent impellers to allow flow of material therethrough, said ring acting with said impellers to change the direction of flow of said material and to distribute said material fed into said cone toward the internal surface thereof and into a ring-shaped space defined by said inner surface, and the outside diameter of said impellers and said ring.

6. The feeding device of claim 5 further including a plurality of deflectors attachable internally of said pellet mill die and extending into the space formed between said cone and said impeller and ring.

7. The feeding device of claim 6 including three deflectors spaced around the circumference of said pellet mill and extending into said ring-shaped space, each of said deflectors being of a shape to sweep substantially one-third of the ring-shaped space in succession.

8. The feeding device of claim 7 wherein said three deflectors extend into said ring-shaped space for varying distances running from one-third the depth to the entire depth of said space in increments of one-third thereof.

9. The feeding device of claim 7 wherein said three deflectors extend into said ring-shaped space so as to occupy and sweep different thirds of said space in the radial direction.

10. A feeding device for a pellet mill comprising a rotatable cone capable of being fixed to a rotating die of a pellet mill,
four helical shape impellers fixed at one end thereof internally of said cone, and having paddles fixed to said impellers and extending into the open space formed centrally of said cone into which material is fed,
a ring secured to and joining the free ends of said impellers internally of said cone, said ring having cutaway cross-sections between adjacent impellers to allow flow of material therethrough, said ring acting with said impellers to change the direction and to distribute material fed into said cone toward the internal surface thereof and into a ring-shaped space defined by said inner surface, and the outside diameter of said impellers and said ring, and
three deflectors spaced around the circumference of said pellet mill and extending into said ring-shaped space, each of said deflectors being of a shape to sweep substantially one-third of the ring-shaped space in the radial direction and being so spaced that said three deflectors cover the entire radial dimension of said ring-shaped space.

11. The feeding device of claim 1 further including a plurality of deflectors attached internally of said pellet mill die and extending into the space formed between said cone and said impeller and ring.

12. The feeding device of claim 11 including three deflectors spaced around the circumference of said pellet mill and extending into said ring-shaped space, each of said deflectors being of a shape to sweep substantially one-third of the ring-shaped space in succession.

13. The feeding device of claim 12 wherein said three deflectors extend into said ring-shaped space for varying distances running fron one-third the depth to the entire depth of said space in increments of one-third thereof.

14. The feeding device of claim 12 wherein said 3 deflectors extend into said ring-shaped space so as to occupy and sweep different thirds of said space in the radial direction.

* * * * *